United States Patent
Sugiyama et al.

(10) Patent No.: US 10,851,965 B2
(45) Date of Patent: *Dec. 1, 2020

(54) RESIN COMPONENT AND DISPLAY DEVICE USING THE SAME

(71) Applicant: Panasonic Intellectual Property Management Co., Ltd., Osaka (JP)

(72) Inventors: Tomonori Sugiyama, Osaka (JP); Satoshi Tanigawa, Tokyo (JP); Takeshi Kiritoshi, Osaka (JP); Takayuki Nagahara, Osaka (JP); Kazuhiko Kaneuchi, Osaka (JP); Hideaki Nakagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 153 days.

This patent is subject to a terminal disclaimer.

(21) Appl. No.: 16/053,722

(22) Filed: Aug. 2, 2018

(65) Prior Publication Data
US 2019/0063722 A1 Feb. 28, 2019

(30) Foreign Application Priority Data
Aug. 25, 2017 (JP) .................. 2017-161698

(51) Int. Cl.
*B32B 7/12* (2006.01)
*F21V 3/06* (2018.01)
*B60Q 3/00* (2017.01)
*B32B 21/08* (2006.01)
(Continued)

(52) U.S. Cl.
CPC ............... *F21V 3/062* (2018.02); *B32B 7/12* (2013.01); *B32B 21/08* (2013.01); *B32B 21/14* (2013.01);
(Continued)

(58) Field of Classification Search
CPC . F21V 3/12; G09F 13/20; G09F 13/08; Y10T 428/24802; Y10T 428/24851; Y10T 428/24901; Y10T 428/2495
(Continued)

(56) References Cited

U.S. PATENT DOCUMENTS

2002/0031620 A1 3/2002 Yuzawa et al.
2008/0099140 A1* 5/2008 Wardein ................. C09J 163/00
156/330
(Continued)

FOREIGN PATENT DOCUMENTS

JP 2001-341106 12/2001
JP 2002-205500 7/2002
(Continued)

*Primary Examiner* — Betelhem Shewareged
(74) *Attorney, Agent, or Firm* — McDermott Will & Emery LLP

(57) ABSTRACT

A resin component includes a natural wooden veneer, a light-transmitting ink printed layer, an adhesive layer, and a light-transmitting reinforcement layer. The veneer includes a sparseness portion and a denseness portion of conduits, is 50% or more and 80% or less in light transmittance, and is 0.1 mm or more and 0.6 mm or less in plate thickness. The light-transmitting ink printed layer is formed on a first surface of the veneer, is 2 μm or more and 20 μm or less in thickness, and contains a pigment or a dye. The adhesive layer is formed on a second surface which is an opposite side of the first surface of the veneer. The reinforcement layer is formed on a surface, which is an opposite side of the veneer, of the adhesive layer.

12 Claims, 4 Drawing Sheets

(51) Int. Cl.
*B32B 21/14* (2006.01)
*F21Y 115/10* (2016.01)
*F21W 121/00* (2006.01)
*G06F 3/044* (2006.01)

(52) U.S. Cl.
CPC .................. *B60Q 3/00* (2013.01); *F21V 3/06* (2018.02); *B32B 2307/412* (2013.01); *B32B 2457/208* (2013.01); *F21W 2121/00* (2013.01); *F21Y 2115/10* (2016.08); *G06F 3/044* (2013.01); *Y10T 428/2495* (2015.01); *Y10T 428/24802* (2015.01); *Y10T 428/24851* (2015.01); *Y10T 428/24901* (2015.01)

(58) Field of Classification Search
USPC ........................................................ 428/207
See application file for complete search history.

(56) References Cited

U.S. PATENT DOCUMENTS

| 2012/0011754 | A1 | 1/2012 | Matyear | |
| 2015/0279251 | A1 | 10/2015 | Matyear | |
| 2015/0343837 | A1 | 12/2015 | Nagase et al. | |
| 2019/0063722 | A1* | 2/2019 | Sugiyama | B60Q 3/54 |
| 2019/0390839 | A1* | 12/2019 | Sugiyama | F21V 3/02 |

FOREIGN PATENT DOCUMENTS

| JP | 2011-095639 A | 5/2011 |
| JP | 2012-521616 | 9/2012 |
| JP | 2013-075449 A | 4/2013 |
| JP | 2015-223751 | 12/2015 |

* cited by examiner

RESIN COMPONENT AND DISPLAY DEVICE USING THE SAME

BACKGROUND

1. Technical Field

The present disclosure relates to a decoration technology by lighting using a veneer, and relates to a resin component and a display device using the same in detail.

2. Description of the Related Art

In recent years, a variety of design expressions are demanded from diversification of tastes of a customer, in decoration methods in fields of exterior decoration of household electric appliances and vehicle-mounted interior decoration. Therefore, to obtain a design expression with high-grade sense, there is a need for a decoration method with high design characteristics using a natural wooden veneer. Here, a term of veneer is referred to as a sheet-shaped plate material which is obtained by thinly slicing wood.

As a decoration method using the veneer, there is a method for expressing an appearance with wood by sticking the veneer to a housing. A method in which a light source is provided on a rear surface of the veneer, and wood grain of the veneer is expressed by being emphasized with light which is transmitted through the veneer, is generally used. In particular, regarding the latter, it is general to display only the wood grain derived from a species of the wood with a sheet of veneer.

Japanese Patent Unexamined Publication No. 2002-205500 (PTL 1) discloses a light-emitting decoration device in which a light guide body is installed on a rear surface of a veneer, a light source such as a light-emitting diode (LED) is disposed to face the rear surface or a side surface of the light guide body, and a natural wood grain of the veneer is utilized. A configuration thereof is illustrated in FIG. 4.

The light-emitting decoration device of FIG. 4 is formed from veneer 21, transparent sheet 22, light guide body 23, and light source 24. Veneer 21 is bonded to transparent sheet 22 using a well-known transparent adhesive, and transparent sheet 22 is placed on light guide body 23 using a fixture which is not illustrated in the drawing.

In the light-emitting decoration device, the wood grain derived from veneer 21 is expressed during the daytime while light source 24 is turned off. Light source 24 is turned on, thereby, light from light source 24 is transmitted through light guide body 23, transparent sheet 22, and veneer 21. Therefore, even in the nighttime or the like, the design characteristics are expressed, by a display utilizing the wood grain of veneer 21 in the same manner as that in the daytime.

SUMMARY

A resin component of the present disclosure includes a natural wooden veneer, a light-transmitting ink printed layer, an adhesive layer, and a light-transmitting reinforcement layer.

The veneer includes a sparseness portion and a denseness portion of conduits, is 50% or more and 80% or less in light transmittance, and is 0.1 mm or more and 0.6 mm or less in plate thickness.

The light-transmitting ink printed layer is formed on a first surface of the veneer, is 2 μm or more and 20 μm or less in thickness, and contains a pigment or a dye.

The adhesive layer is formed on a second surface which is an opposite side of the first surface of the veneer.

The reinforcement layer is formed on a surface, which is an opposite side of the veneer, of the adhesive layer.

Moreover, a resin component of the present disclosure includes a natural wooden veneer, a pattern printed layer, an adhesive layer, and a light-transmitting reinforcement layer.

The veneer includes a sparseness portion and a denseness portion of conduits, is 50% or more and 80% or less in light transmittance, and is 0.1 mm or more and 0.6 mm or less in plate thickness.

The pattern printed layer is formed on one side of the veneer, and in which a pattern is partially printed.

The adhesive layer is formed on a surface, which is an opposite side of the veneer, of the pattern printed layer.

The reinforcement layer is formed on a surface, which is an opposite side of the pattern printed layer, of the adhesive layer.

Furthermore, a display device of the present disclosure incudes the resin component described above, and a light source.

DETAILED DESCRIPTIONS

In an example of the related art, only wood grain derived from veneer 21 is displayed, regardless of turning on and off light source 24 on a rear side of veneer 21. Therefore, it is possible to express only one kind of wood grain derived from a species of wood with a sheet of veneer 21, and there is a need to newly prepare veneers of other species in order to display wood grains which are different from each other.

In a case where the light-emitting decoration device is used for a vehicle-mounted industrial product or the like, a shape, a position, light and shade and the like of the wood grain are not uniform because of natural wood. Therefore, since it is not possible to display the wood grain of which a tone, the position and the like are the same per product, there is a case where a problem as an appearance quality is made.

Hereinafter, exemplary embodiments will be described based on drawings.

First Exemplary Embodiment

Figure 1A:
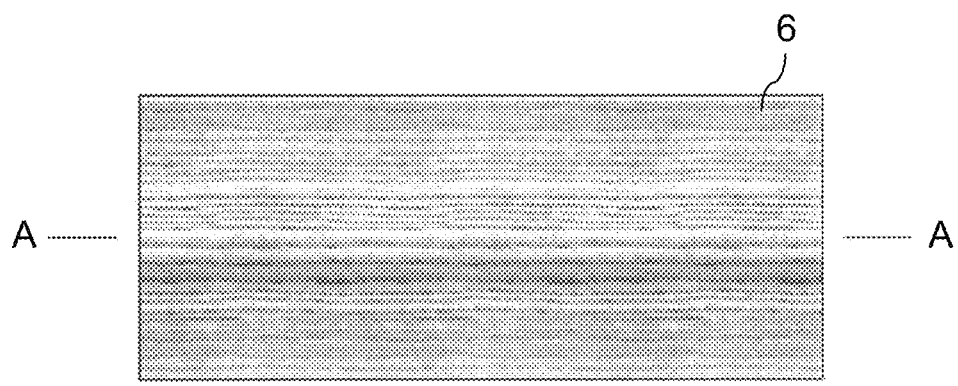
FIG. 1A is a front view of a display device using a resin component according to a first exemplary embodiment.
Figure 1B:
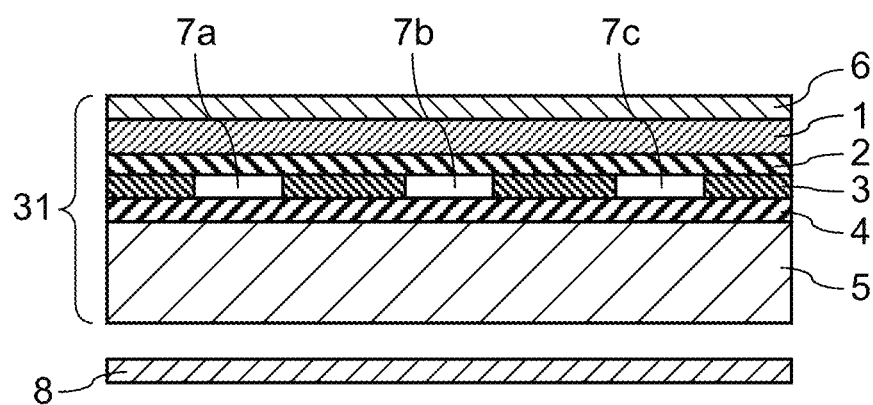
FIG. 1B is a sectional view taken along A-A line in FIG. 1A.

FIG. 1A and FIG. 1B illustrate a display device using a resin component according to a first exemplary embodiment. The display device is formed of resin component 31 which uses veneer 1 as a configuration element, and light source 8 for a backlight.

Resin component 31 is configured as follows.

Adherence layer 2, and concealment layer 3 are formed in sequence on a rear surface (second surface) of natural wooden veneer 1. Furthermore, reinforcement layer 5 is joined thereto by insert-molding through adhesive layer 4. Veneer 1 is white natural wood, and is a sliced sheet-shaped plate that is 50% or more and 80% or less in light transmittance, and is 0.1 mm or more and 0.6 mm or less in plate thickness. Unevenness derived from the natural wood is formed on a surface of veneer 1.

On the surface (first surface) of veneer 1, light-transmitting ink printed layer 6 which is 2 μm or more and 20 μm or less in thickness, and has a wood grain styled design, is formed. A thickness of light-transmitting ink printed layer 6 is a thickness sufficient for realizing the sense of touch for surface unevenness of veneer 1 when a user touches the surface thereof. In other words, a shape of the surface unevenness of veneer 1 also appears on the surface of light-transmitting ink printed layer 6, as unevenness. Here, the wood grain styled design includes a design that is formed by wood grain printing, printing for expressing feeling of the wood, or the like. Here, the surface of veneer 1 is referred to as a first surface, and the rear surface thereof is referred to as a second surface, but the surface of veneer 1 may be referred to as a second surface, and the rear surface thereof may be referred to as a first surface. That is, light-transmitting ink printed layer 6 may be formed on the rear surface of veneer 1.

As a pigment or a dye of light-transmitting ink printed layer 6, it is preferable to use a pigment or a dye which is formed by being micronized to nanosize and being dispersed.

Adherence layer 2 is formed of a light-transmitting non-woven fabric, a light-transmitting film, or the like which has a gap. Adherence layer 2 is joined to veneer 1, as a base member of veneer 1. Adherence layer 2 diffuses light from light source 8 described later, and transmits the light toward veneer 1.

In a portion of concealment layer 3, light-transmitters 7a, 7b, and 7c are formed. Concealment layer 3 other than a portion in which light-transmitters 7a, 7b, and 7c are formed, is formed of a light-shielding material which does not transmit the light. Adhesive layer 4 is formed of a light-transmitting adhesive. Reinforcement layer 5 is formed of a light-transmitting transparent resin.

On the surface which is an opposite side of adhesive layer 4 in reinforcement layer 5, light source 8 such as a light-emitting diode (LED) is disposed at a distance that is optional from reinforcement layer 5. As light source 8, for example, a light-emitting diode chip of blue color, red color, and green color (three primary colors of light) which is built in single package is used, thereby, it is possible to easily control a change of colors or the like, and it is possible to express full color. It is possible to use other light sources other than the LED as a backlight.

If the thickness of light-transmitting ink printed layer 6 is larger than 20 μm, light-transmitting properties are lowered. Therefore, when the light is emitted from the rear surface of veneer 1 using light source 8, accuracy of a wood grain display derived from the veneer is worsened. The feeling for the unevenness on the surface of light-transmitting ink printed layer 6 is reduced, and the sense of touch for the natural wood is damaged.

At the time of turning off light source 8, the light which is reflected from the surface of light-transmitting ink printed layer 6 due to the light from an outside is larger than the light which is transmitted from the rear surface of veneer 1. Therefore, veneer 1 is not viewed at the time of being visually confirmed to the naked eye with the light from the outside, and only the wood grain styled design of light-transmitting ink printed layer 6 which is printed on veneer 1 is visually confirmed. For that reason, even if resin component 31 is used for exterior decoration of household electric appliance or vehicle-mounted interior decoration, it is possible to only confirm resin component 31 as a portion of the exterior decoration or the like of household electric appliances.

Since veneer 1 which is used herein is the natural wood, even if the wood grain styled design is printed on the surface thereof, the sense of touch for the surface derived from the natural wood is obtained even from the printed surface. White veneer 1 which is 0.1 mm or more and 0.6 mm or less in plate thickness, and is 50% or more and 80% or less in light transmittance is used, thereby, even in a case of being a species of wood of dark color through which the light is unlikely to be transmitted as a general rule, it is possible to express the wood grain thereof or color by printing. Therefore, at the time of turning on light source 8, a rendering that a wood grain of a species of wood which is different from the wood grain described above floats up is possible, by light transmission.

If the plate thickness of the natural wood is smaller than 0.1 mm, it is unlikely to be handled as a plate material having a fiber thickness or less in accordance with the species of wood. If the plate thickness of the natural wood is larger than 0.6 mm, it is disadvantageous from a point of light transmittance.

Regarding light-transmitting ink printed layer 6, it is effective not only in a case where the wood grain that is the same as that of the species of wood of veneer 1 which is used herein is printed, but also in a case where the color of the wood is fixed by being only applied.

At the time of providing light-transmitting ink printed layer 6, in a case where weather resistance or the like is assigned, a treatment such as hard coating may be carried out onto the surface of light-transmitting ink printed layer 6.

In a case where light-transmitting ink printed layer 6 is not provided, at the time of assigning the weather resistance or the like, the treatment such as hard coating may be carried out onto the surface of veneer 1.

For the printing of light-transmitting ink printed layer 6, it is preferable to use ink jet printing, screen printing, or the like. FIG. 1B illustrates a state in which reinforcement layer 5 is formed of the resin by the insert-molding. However, a resin plate, a glass plate, or the like may be used as long as it is a member which has light-transmitting properties and strength in combination. For the resin which is capable of being used as a resin material of reinforcement layer 5, a general-purpose molding resin such as a PMMA resin, an ABS resin, a PS resin, and a PC resin may be used. In a case where bonding or the like is used without using the insert-molding, a resin such as a resin for an optical use or super engineering plastic which has a need to perform the molding at a high temperature is also available. Accordingly, a case of being used for a lamp cover or the like is possible. Even if the material thereof or the use thereof is changed in this manner, at the time of turning off light source 8, the light which is reflected from the surface of light-transmitting ink printed layer 6 due to the light from the outside is larger than the light which is transmitted from the rear surface of veneer 1, in the same manner as described above. Therefore, veneer 1 is not viewed at the time of being visually confirmed to the naked eye, and only the wood grain styled design of light-transmitting ink printed layer 6 which is printed on veneer 1 is visually confirmed. Accordingly, the renderings of the wood grains which are different from each other are possible, by turning on and off light source 8 which is provided on the rear face of veneer 1.

Veneer 1 is the natural wood, and a sparseness portion and a denseness portion of conduits in the natural wood is capable of being impregnated with an impregnation material such as a pigment, a dye, a phosphorescent material, or a fluorescent material. In this case, the dye, the phosphorescent material or the like is largely contained in the sparseness portion and the denseness portion of the conduits in veneer 1 which is the natural wood, thereby, it is possible to assign a design with high design characteristics in which the wood grain floats up more noticeably.

By the configuration described above, at the time of turning off light source 8, there are only the sense of touch for the surface of veneer 1 and an appearance of the printed wood grain, but at the time of turning on light source 8, the wood grain which is different from that at the time of turning off light source 8 appears. Therefore, it is possible to render the design with high design characteristics.

Second Exemplary Embodiment

Figure 2A:
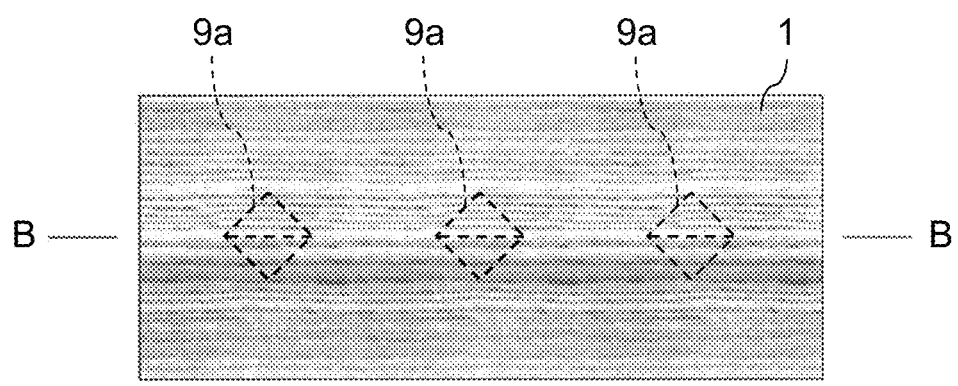
FIG. 2A is a front view of a display device using a resin component according to a second exemplary embodiment.
Figure 2B:
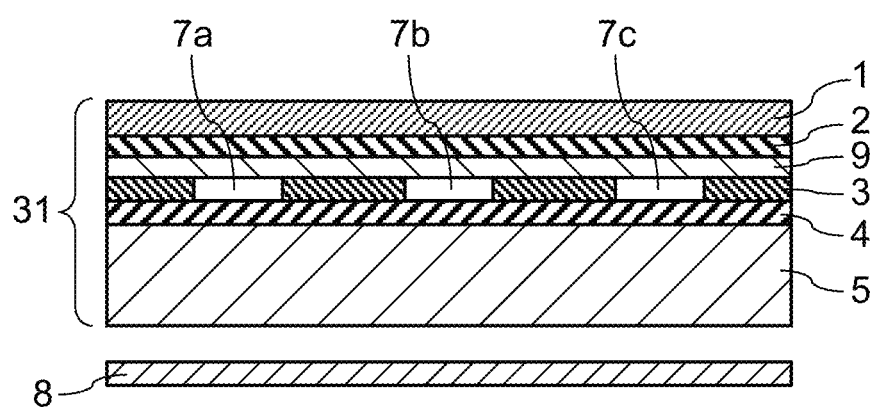
FIG. 2B is a sectional view taken along B-B line in FIG. 2A.

FIG. 2A and FIG. 2B illustrate a display device using a resin component according to a second exemplary embodiment.

The same reference sign is attached to a portion that makes the same function as that in the first exemplary embodiment, and the description thereof will be omitted.

In the resin component of the first exemplary embodiment, light-transmitting ink printed layer 6 is formed on the surface of veneer 1. However, in the second exemplary embodiment, light-transmitting ink printed layer 6 is not formed on the surface of veneer 1. In the second exemplary embodiment, as illustrated in FIG. 2B, pattern printed layer 9 is formed on the rear surface of veneer 1 through adherence layer 2. In pattern printed layer 9, a pattern is partially printed, by an ink which is low in light transmittance. On the rear surface side of pattern printed layer 9, reinforcement layer 5 which is formed of the resin or the like is joined thereto by the insert-molding through concealment layer 3 and adhesive layer 4.

In a case of the display device according to the second exemplary embodiment, light source 8 is disposed at a distance that is optional on the rear surface of veneer 1, in the same manner as that in the first exemplary embodiment.

By such a configuration, since the light which is reflected from the surface of veneer 1 is larger than the light which is transmitted from the rear surface of veneer 1 in the light from the outside, it is possible to visually confirm the wood grain derived from veneer 1. The light transmittance is low in the pattern portion of pattern printed layer 9 which is provided on the rear surface of veneer 1, and the light transmittance is high in a portion other than the pattern portion. Therefore, if the light is emitted from light source 8 on the rear surface of veneer 1, the pattern portion of pattern printed layer 9 becomes a shadow, and is displayed to float up as a pattern 9a on the outermost surface of veneer 1. In this manner, it is possible to render two kinds of design expressions with a sheet of veneer, in the same manner as that in the first exemplary embodiment.

In the second exemplary embodiment, veneer 1 may be a species of wood which is dark in tone, but it is preferable to be a white species of wood which is light in tone.

It is preferable to print pattern printed layer 9 using screen printing, ink jet printing, or the like. It is possible to freely set the design of the pattern by the user, such that the design of the pattern is a geometric pattern or a line shape. For the used ink, it is preferable to use a general-purpose ink which is unlikely to transmit the light.

In the same manner as that in the first exemplary embodiment, a case of being used for a lamp cover or the like is possible. In this case, adhesive layer 4 and reinforcement layer 5 on the rear surface side of veneer 1 are not necessarily needed. The renderings which are different from each other in wood grain and pattern are possible, by turning on and off the light source which is provided on the rear surface of veneer 1.

In this manner, at the time of turning off the light source, only the appearance of the veneer is expressed, but it is possible to visibly confirm the pattern on the surface of the veneer, as being changed entirely, by turning on the light source. Therefore, the rendering such that an alarm is given to the user is possible.

Third Exemplary Embodiment

Figure 3A:
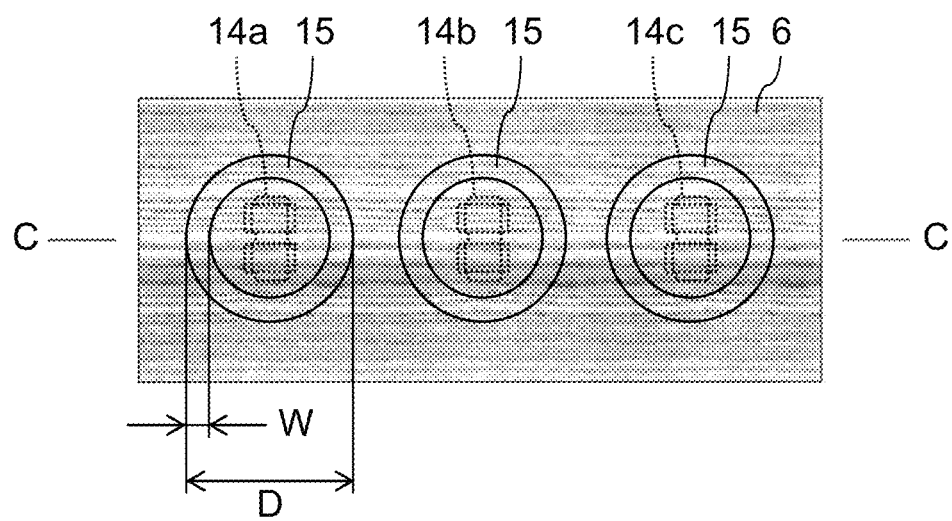
FIG. 3A is a front view of a display device using a resin component according to a third exemplary embodiment.
Figure 3B:
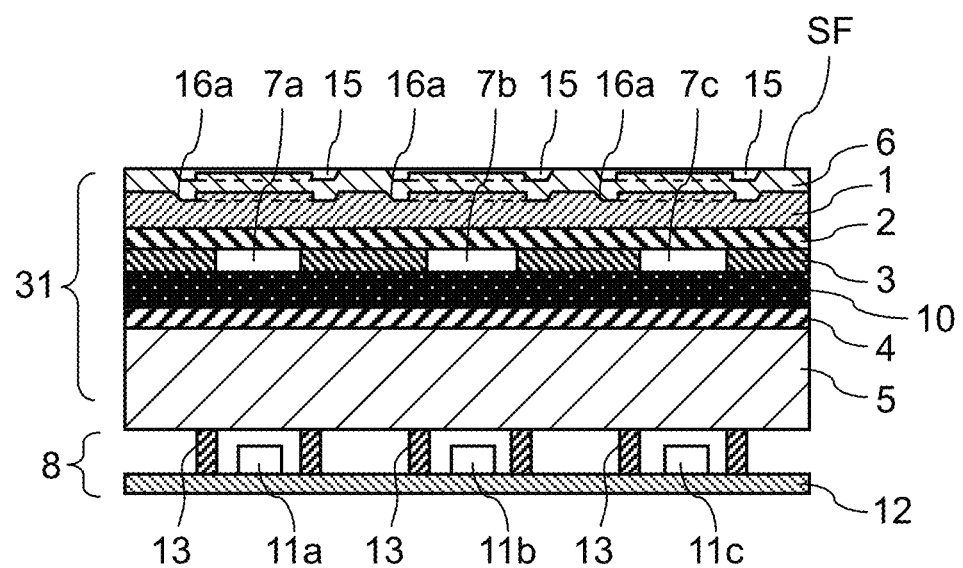
FIG. 3B is a sectional view taken along C-C line in FIG. 3A.
Figure 4:
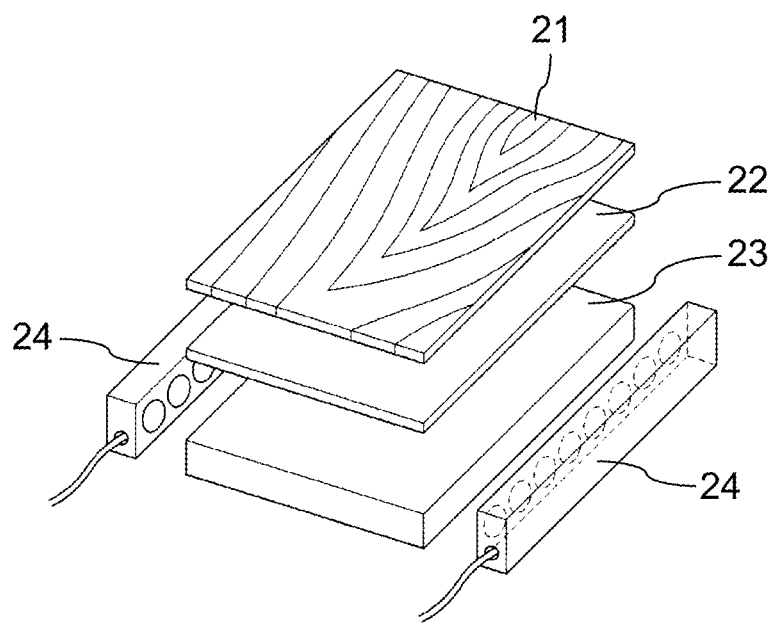
FIG. 4 is an exploded perspective view of a light-emitting decoration device in the related art.

FIG. 3A and FIG. 3B illustrate a display device using a resin component according to a third exemplary embodiment.

The same reference sign is attached to a portion that makes the same function as those in the first exemplary embodiment and the second exemplary embodiment, and the description thereof will be omitted.

The third exemplary embodiment is configured as a display device that is provided with input device 10 of an electrostatic capacity type or the like on the rear surface of veneer 1, in addition to the configurations of the first exemplary embodiment and the second exemplary embodiment.

By such a configuration, the display device detects an input operation that the user slides a finger on an operation panel of the display device. For example, it is possible to turn up and down an output volume setting of a sound device, a temperature setting, or the like.

On the surface which is the opposite side of adhesive layer 4 in reinforcement layer 5, base 12 on which LED light sources 11a, 11b, and 11c are mounted is disposed. Intervals between light sources 11a, 11b, and 11c are configured to be the same as those between light-transmitters 7a, 7b, and 7c of concealment layer 3. Circumferences of light sources 11a, 11b, and 11c are surrounded by shielding plates 13.

If light source 11a is turned on, light-transmitter 7a of concealment layer 3, veneer 1, and light-transmitting ink printed layer 6, respectively, transmits the light, and mark 14a denoting a display area is displayed on the surface of light-transmitting ink printed layer 6. The shape of light-transmitter 7a is displayed as a shape of mark 14a.

If light source 11b is turned on, light-transmitter 7b of concealment layer 3, veneer 1, and light-transmitting ink printed layer 6, respectively, transmits the light, and mark 14b denoting a display area is displayed on the surface of light-transmitting ink printed layer 6. The shape of light-transmitter 7b is displayed as a shape of mark 14b.

If light source 11c is turned on, light-transmitter 7c of concealment layer 3, veneer 1, and light-transmitting ink printed layer 6, respectively, transmits the light, and mark 14c denoting a display area is displayed on the surface of light-transmitting ink printed layer 6. The shape of light-transmitter 7c is displayed as a shape of mark 14c.

It is possible to set the design for the shapes, sizes, numbers, display positions, or the like of marks 14a, 14b, and 14c optionally by the user. The display is not limited to the mark, and a display form using letters or numbers such as seven segments is possible, and it is possible to set the display optionally by the user.

In the same manner as those in the first exemplary embodiment and the second exemplary embodiment, for light sources 11a, 11b, and 11c, the light-emitting diode chip of blue color, red color, and green color (three primary colors of light) which is built in single package is used, thereby, it is possible to easily control the change of colors or the like, and it is possible to express full color. It is possible to use other light sources other than the LED as a backlight.

In the third exemplary embodiment, groove 15 of an annular shape is formed around marks 14a, 14b, and 14c. Groove 15 is configured by forming light-transmitting ink printed layer 6 on the surfaces of concave portions 16a, 16b, and 16c of annular shapes which are provided on the surface of veneer 1. Both of the materials and the light-transmitting properties of light-transmitting ink printed layer 6 and veneer 1 are the same as those in the first exemplary embodiment.

The rear surface of veneer 1 is configured of adherence layer 2, concealment layer 3, input device 10, adhesive layer 4, and reinforcement layer 5. Light source 8 is installed on the opposite side of adhesive layer 4 in reinforcement layer 5.

For example, when electrostatic capacitive input device 10 is used, in a case where the user touches a bottom portion of groove 15 with the finger, and slides the finger along groove 15, a coordinate of the approaching finger of the user is detected. In input device 10, electrode patterns having the function described above are formed in a matrix shape. The electrode pattern is formed at least along groove 15.

In a case where the user performs the operation with the finger, it is suitable that a depth of groove 15 from outermost surface SF of the display device is 5 mm or less, and width W of groove 15 is 10 mm or less. In the third exemplary embodiment, diameter D of groove 15 is 40 mm, width W of groove 15 is 8 mm, and the depth of groove 15 is 2 mm.

In the third exemplary embodiment, groove 15 is provided to be annular-shaped, but a groove of an arc shape, a straight line shape having an optional length, or the like may be used. By such a configuration, not only the input of a rotary motion operation but also a slide typed straight line operation are possible. At that time, the depth from the outermost surface of the display device is preferably 20 mm or less, and the width of the groove is preferably 40 mm or less, in the same manner as described above.

Groove 15 is provided in this manner, thereby, it is possible to improve operability for sliding the finger of the user up to a sliding-desired spot in a contact state. Not only the sense of touch for the surface of the veneer and the design characteristics of the appearance described in the first exemplary embodiment and the second exemplary embodiment are improved, but also it is possible to provide the input device having the rendering such that the display appears, as being changed entirely, at the time of turning on the light source, and the alarm is given to the user, by being combined with input device 10 of the electrostatic capacity type or the like.

In FIG. 3A and FIG. 3B, in addition to the configuration of the first exemplary embodiment, a case of the display device in which input device 10 of the electrostatic capacity type or the like is provided on the rear surface of the veneer is described as an example. However, in addition to the configuration of the second exemplary embodiment, input device 10 of the electrostatic capacity type or the like may be provided on the rear surface of veneer 1.

According to the configuration of the present disclosure, the wood grain derived from the veneer is not viewed when the light-transmitting ink printed layer on the surface of the veneer is visually observed only in the light from the outside, and if the light is emitted from the light source on the rear surface of the veneer, it is possible to visually confirm the wood grain derived from the veneer.

In a case of the resin component in which the pattern printed layer is provided on the rear surface side of the veneer without providing the light-transmitting ink printed layer on the surface of the veneer, the wood texture derived from the veneer is viewed only in the light from the outside, and if the irradiation with the light is performed from the light source on the rear surface of the veneer, it is possible to visually confirm the pattern of the pattern printed layer.

The present disclosure contributes to high functionality making of exterior decoration of various household electric appliances and the like, or vehicle-mounted interior decoration.

What is claimed is:

1. A resin component comprising:
   a natural wooden veneer that includes a sparseness portion and a denseness portion of conduit, is 50% or more and 80% or less in light transmittance, and is 0.1 mm or more and 0.6 mm or less in plate thickness;
   a light-transmitting ink printed layer, which is formed on a first surface of the veneer, is 2 µm or more and 20 µm or less in thickness, and contains a pigment or a dye;
   an adhesive layer that is formed on a second surface which is an opposite side of the first surface of the veneer; and
   a light-transmitting reinforcement layer formed on a surface, which is an opposite side of the veneer, of the adhesive layer.

2. The resin component of claim 1,
   wherein in a case where the resin component is viewed from above the first surface of the veneer while being irradiated with light from a side of the reinforcement layer, since the sparseness portion of which the conduits are sparse on an inside of the veneer is higher than the denseness portion in light transmittance, wood grain of the veneer is visible, and visibility of the light-transmitting ink printed layer is lower than visibility of the wood grain of the veneer, and
   in a case where the resin component is viewed from above the first surface of the veneer while not being irradiated with light from a side of the reinforcement layer, the light-transmitting ink printed layer is visible, and the veneer is not visible.

3. The resin component of claim 2, further comprising:
   an adherence layer that has a gap, and diffuses light, between the second surface of the veneer and the adhesive layer.

4. The resin component of claim 3, further comprising:
   a concealment layer, in which a specific pattern is formed, between the second surface of the veneer and the adhesive layer,
   wherein only a portion in which the concealment layer is not formed transmits light when the light irradiates from a side of the reinforcement layer.

5. The resin component of claim 4, further comprising:
   an electrostatic capacitive input device, between the second surface of the veneer and the reinforcement layer.

6. The resin component of claim 5, further comprising:
a groove that has an annular shape, an arc shape, or a straight line shape, on the first surface of the veneer,
wherein the input device has a matrix-shaped electrode pattern that is capable of detecting a coordinate of a finger of a user approaching along the groove.

7. The resin component of claim 6,
wherein a depth of the groove is 5 mm or less, and a width of the groove is 10 mm or less.

8. The resin component of claim 2,
wherein a pigment or a dye is contained on the inside of the veneer, and the denseness portion of the conduits contains more of the pigment or the dye than the sparseness portion of the conduits.

9. The resin component of claim 8,
wherein a phosphorescent material or a fluorescent material is contained on the inside of the veneer, and the denseness portion of the conduits contains more of the phosphorescent material or the fluorescent material than the sparseness portion of the conduits.

10. A resin component comprising:
a natural wooden veneer that includes a sparseness portion and a denseness portion of conduits, is 50% or more and 80% or less in light transmittance, and is 0.1 mm or more and 0.6 mm or less in plate thickness;
a pattern printed layer that is formed on one side of the veneer, and in which a pattern is partially printed;
an adhesive layer formed on a surface, which is an opposite side of the veneer, of the pattern printed layer; and
a light-transmitting reinforcement layer formed on a surface, which is an opposite side of the pattern printed layer, of the adhesive layer.

11. A display device comprising:
the resin component of claim 6; and
a light source.

12. A display device comprising:
the resin component of claim 10; and
a light source.

* * * * *